(12) United States Patent
Nagai

(10) Patent No.: US 11,262,129 B2
(45) Date of Patent: Mar. 1, 2022

(54) GAS PHASE TYPE HEATING METHOD AND GAS PHASE TYPE HEATING DEVICE

(71) Applicant: Panasonic Intellectual Property Management Co., Ltd., Osaka (JP)

(72) Inventor: Koichi Nagai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 381 days.

(21) Appl. No.: 16/595,464

(22) Filed: Oct. 8, 2019

(65) Prior Publication Data

US 2020/0141652 A1 May 7, 2020

(30) Foreign Application Priority Data

Nov. 7, 2018 (JP) .............................. JP2018-209898

(51) Int. Cl.
| | |
|---|---|
| *F27D 7/02* | (2006.01) |
| *F27D 3/00* | (2006.01) |
| *F27D 7/06* | (2006.01) |
| *F27D 9/00* | (2006.01) |
| *F27D 19/00* | (2006.01) |

(52) U.S. Cl.
CPC ............... *F27D 7/02* (2013.01); *F27D 3/00* (2013.01); *F27D 7/06* (2013.01); *F27D 2009/0002* (2013.01); *F27D 2019/0006* (2013.01)

(58) Field of Classification Search
CPC ..................... F27D 7/02; F27D 7/06
See application file for complete search history.

(56) References Cited

U.S. PATENT DOCUMENTS

| | | | | |
|---|---|---|---|---|
| 4,321,031 A | * | 3/1982 | Woodgate | B23K 1/015 219/388 |
| 4,612,712 A | * | 9/1986 | Pescatore | F28C 3/005 34/68 |
| 4,681,249 A | * | 7/1987 | Kondo | B23K 1/015 228/180.1 |
| 4,838,476 A | | 6/1989 | Rahn | |
| 5,333,774 A | * | 8/1994 | Mishina | B23K 1/015 228/46 |

(Continued)

FOREIGN PATENT DOCUMENTS

| | | |
|---|---|---|
| JP | 60-108163 | 6/1985 |
| JP | 2-502200 | 7/1990 |

(Continued)

OTHER PUBLICATIONS

English Translation of Search Report dated Feb. 20, 2021 in corresponding Chinese Patent Application No. 201911069456.2.

*Primary Examiner* — Nathaniel Herzfeld
(74) *Attorney, Agent, or Firm* — Wenderoth, Lind & Ponack, L.L.P.

(57) ABSTRACT

A gas phase type heating method includes loading an object into a vapor heating furnace or a heating furnace via a loading/unloading portion, cooling vapor of a heat transfer liquid by a cooler provided above the loading/unloading portion in the vapor heating furnace, and causing a gas to go in and out, making a pressure in a continuous furnace uniform, and heating the loaded object, by a connection portion that is provided above the cooler and has a pressure loss smaller than a pressure loss of the loading/unloading portion.

7 Claims, 11 Drawing Sheets

(56) References Cited

U.S. PATENT DOCUMENTS

| | | | |
|---|---|---|---|
| 6,021,940 A | 2/2000 | Sindzingre et al. | |
| 6,089,445 A | 7/2000 | Sindzingre et al. | |
| 2005/0173497 A1* | 8/2005 | Dokkedahl | B23K 1/015 228/219 |
| 2008/0185421 A1* | 8/2008 | Diehm | B23K 1/008 228/176 |
| 2016/0167148 A1 | 6/2016 | Oyama et al. | |

FOREIGN PATENT DOCUMENTS

| | | |
|---|---|---|
| JP | 3-005269 B | 1/1991 |
| JP | 4-237558 | 8/1992 |
| JP | 8-008522 | 1/1996 |
| JP | 2016-115732 | 6/2016 |
| WO | 03/106093 | 12/2003 |

* cited by examiner

LOSS FACTOR: 0.005~0.06

GAS PHASE TYPE HEATING METHOD AND GAS PHASE TYPE HEATING DEVICE

BACKGROUND

1. Technical Field

The present disclosure relates to a gas phase type heating method and a gas phase type heating device that heats an object by using latent heat of condensation of vapor of a heat transfer liquid.

2. Description of the Related Art

In recent years, in an assembly manufacturing step of a variety of industrial products or home appliances, or a device manufacturing step of a board on which various types of electronic components, various types of batteries, or electronic components to become configuration components of the products are mounted, a shape of an object processed by various types of heating processing devices is becoming complicated. For example, in a weak holding force state where solder paste is applied to a portion other than a horizontal surface of a board on which electronic components are mounted, including not only a flat board but also a three-dimensional board, and the electronic components are simply disposed, heating processing for melting the solder paste and bonding the electronic components is performed. In addition, by making an object three-dimensional, the heat capacity of the object tends to increase. Herein, examples of the various types of heating processing devices include a drying furnace, a curing furnace, or a reflow furnace that is used in soldering in an electronic component mounting step.

In a heating step for the objects, in a case where there are variations in a temperature rise of each part of the objects due to a non-uniform heating performance, to obtain a desired time required for the heating step, it is necessary to maintain the desired time from a state where all portions have risen to a desired temperature. Therefore, to hold a portion where a temperature rise is slow for the desired time, a portion where a temperature rise is fast is exposed to excessive heat. Thus, in a case of an object with a particularly large thermal effect, there is a concern of affecting the quality of the object. In addition, in a heating step of using heat transfer caused by collision of hot air, in a case where the heat capacity of an object is high, a heat transfer rate can be improved by increasing a speed at which hot air collides with the object to obtain a desired temperature rising speed.

However, for example, in a case where it is necessary to perform heating processing in a holding force weak state where solder paste is applied to the portion other than the horizontal surface of the three-dimensional board and the electronic components are simply disposed, a possibility that the components are peeled off the board by colliding with hot air at a high speed before solidification of solder is completed by solder melting and subsequent cooling is high.

As a method of avoiding peeling of components off a board having high heat capacity as well due to collision of hot air and efficiently heating an object by using a high heat transfer rate, a heating method for a vapor heating furnace that heats the object by using latent heat of condensation of vapor of a heat transfer liquid is known. Since the vapor used in this vapor heating furnace has great specific gravity compared to air, the air and the vapor are relatively easily separated into two phases. However, since an inlet/outlet is provided in the vapor heating furnace in general to load/unload the object in the vapor heating furnace, the vapor easily flows to the outside of the furnace, and the vapor of the important heat transfer liquid is lost without being able to be collected.

To respond to this, the following methods are known in general.

(1) An opening portion for loading and unloading an object is provided above a boundary surface that separates air from vapor of a heat transfer liquid in a vapor heating furnace by a specific gravity difference. Provided is a method of loading and unloading the object into and from the vapor heating furnace via the opening portion.

(2) A closed space for temporarily shielding a vapor heating furnace and an external space is configured by providing double shutters in an inlet/outlet of the vapor heating furnace, through which an object is loaded and unloaded. Provided is a method of differentiating the vapor heating furnace from the external space when loading and unloading the object.

(3) A condenser that has a relatively long tunnel provided in an inlet/outlet of a vapor heating furnace and condenses vapor of a heat transfer liquid by a cooler in the tunnel is provided. Provided is a method of condensing and collecting the vapor flowed out into the tunnel.

However, in a case of Method (1), to heat an object, it is necessary to move the object downwards below a horizontal surface, along which the object has loaded into the vapor heating furnace, to a height at which the object is soaked in the vapor of the heat transfer liquid. Therefore, a mechanism for transporting is complicated, and air is mixed in the vapor of the heat transfer liquid since the vapor of the heat transfer liquid in the vapor heating furnace is stirred when loading the object and soaking the object downwards in a phase of the vapor. Therefore, there is a possibility that a heating performance itself according to latent heat of condensation of the vapor of the heat transfer liquid decreases.

In a case of Method (2), in particular on an outlet side of the vapor heating furnace, when a shutter on a vapor heating furnace side of the closed space is temporarily opened to deliver an object to the closed space on the outlet side, also the vapor of the heat transfer liquid is introduced into the closed space together with the object. Therefore, when a shutter on an external space side of the closed space is temporarily opened to unload the object delivered to the closed space to the external space, some of the vapor of the heat transfer liquid cannot be prevented from flowing out to the external space along with the object that is being unloaded to the external space.

In Method (3), the vapor of the heat transfer liquid is temporarily cooled and liquefied, and then is collected. Since latent heat of gasification required for heating for gasifying the heat transfer liquid into vapor is cooled and taken away as it is, a great loss of energy is caused. Depending on a vapor cooling temperature, the vapor of the heat transfer liquid is not gasified by a saturated vapor pressure of the heat transfer liquid, and some of the vapor flows out to the atmosphere.

To respond to the problems, for example, a method of Japanese Patent Unexamined Publication No. S60-108163 is known. FIG. 13 is an explanatory view of a gas phase type soldering device of the related art of Japanese Patent Unexamined Publication No. S60-108163. A configuration disclosed in Japanese Patent Unexamined Publication No. S60-108163 is the following configuration. FIG. 13 is a side view, and a left half of vapor heating furnace 25 is a longitudinal section.

Liquid 30 is a heat transfer liquid for generating vapor 21 by heating. Exhaust port 22 is a nozzle for discharging a gas in vapor heating furnace 25 to the outside of the furnace. Inlet/outlet 23 is an inlet/outlet end which serves as a boundary between the inside and the outside of the furnace. Conveyor 24 is a conveyor for loading an object into vapor heating furnace 25. Tunnel 26 is a passage through which the object is loaded and unloaded, and is a passage of air flow. Tunnel 27 is a tunnel obtained by extending tunnel 26, and is a passage through which the object is loaded. Tunnel 28 is at a boundary between tunnel 26 and tunnel 27, is divided from tunnel 26, and extends from upper portions of tunnels 26 and 27 in an obliquely upward direction. Tunnel 28 is a passage of air flow passing through tunnel 26. Discharge port 29 is a nozzle for discharging this air flow.

When liquid 30 is heated and vapor 21 is generated, vapor 21 rises to a certain height inside vapor heating furnace 25, and forms boundary surface 31 between air and vapor with an air phase above. On the contrary, some vapor flows to the outside of the furnace through inlet/outlet 23 and tunnel 27. Herein, when air flow having momentum that exceeds the momentum of flowed-out vapor is generated in tunnel 26, this air flow passes through tunnel 28, and is discharged by discharge port 29. Therefore, vapor 21 flowed out to tunnel 27 is pushed backed by this air flow, and is prevented from flowing to the outside of the furnace.

It is sufficient that a length of tunnel 26 is three times or more a tunnel height to generate uniform air flow in a flowing direction in tunnel 26. Tunnel 28 extends in the obliquely upward direction toward vapor heating furnace 25 to lead the air, which has passed through tunnel 26, upwards as smoothly as possible. When a vortex occurs in the boundary between tunnel 26 and tunnel 28, vapor in tunnel 27 can be swallowed up. Since the specific gravity of vapor 21 relative to air is great, the vapor gathers to a lower portion, that is, in tunnel 27. Thus, air flow leads vapor 21 upwards.

More preferably, kinetic energy of air passing through tunnel 26 is made larger than kinetic energy of vapor flowing out through inlet/outlet 23 of tunnel 27 to keep the vapor in tunnel 27. That is, when the specific gravity of vapor relative to air is defined as $\alpha$, an average flow speed of flowed-out vapor is defined as $V1$, and a flow speed of the air is defined as $V2$, it is desirable that a relation of $V2 > V1 \times \sqrt{\alpha}$ be established.

When a pressure in an upper portion of vapor heating furnace 25 is made smaller than a pressure in tunnel 28 such that an air side and a vapor side become a uniform pressure in inlet/outlet 23 of tunnel 27, a pressure at which vapor is gushed out becomes small. Then, an inclined air-vapor boundary surface is generated in tunnel 27, and the amount of vapor flowing out decreases significantly.

Since condensate naturally returns to vapor heating furnace 25 when a gradient is somewhat added to fall toward vapor heating furnace 25 along with tunnel 26 and tunnel 27, it is convenient.

SUMMARY

According to an aspect of the present disclosure, there is provided a gas phase type heating method of heating an object by a continuous furnace including a vapor heating furnace that heats the object by using latent heat of condensation of vapor of a heat transfer liquid and a heating furnace that communicates with the vapor heating furnace.

The method includes loading the object into the vapor heating furnace or the heating furnace via a loading/unloading portion that allows the vapor heating furnace and the heating furnace to communicate with each other, cooling the vapor of the heat transfer liquid by a cooler provided above the loading/unloading portion in the vapor heating furnace, and causing a gas to go in and out between the vapor heating furnace and the heating furnace, making a pressure in the continuous furnace uniform, and heating the loaded object, by a connection portion that is provided above the cooler, allows the vapor heating furnace and the heating furnace to communicate with each other, and has a pressure loss smaller than a pressure loss of the loading/unloading portion.

According to another aspect of the present disclosure, there is provided a gas phase type heating device that is configured by a continuous furnace including a vapor heating furnace heating an object by using latent heat of condensation of vapor of a heat transfer liquid and a heating furnace communicating with the vapor heating furnace, and heats the object.

The vapor heating furnace includes a loading/unloading portion, a cooler, and a connection portion.

The loading/unloading portion communicates with the heating furnace.

The cooler is disposed above the loading/unloading portion and cools the vapor of the heat transfer liquid.

The connection portion is disposed above the cooler, allows the vapor heating furnace and the heating furnace to communicate with each other, allows a gas to go in and out between the vapor heating furnace and the heating furnace, and has a pressure loss smaller than a pressure loss of the loading/unloading portion.

DETAILED DESCRIPTION

In the configuration of Japanese Patent Unexamined Publication No. S60-108163, in a case of a device in which the vapor heating furnace is configured by only one single zone, an operation of taking in air flow from outside and confining vapor of a heat transfer liquid in the vapor heating furnace by air flow control is possible as described above.

However, when it is necessary to form a more complicated temperature profile, a device using not only one zone but using a plurality of vapor heating furnaces or a plurality of heating furnaces that use heating means other than a heating method, in which latent heat of condensation of vapor is used, is necessary. In this case, in a narrow space between the plurality of adjacent vapor heating furnace or between the plurality of heating furnaces, a special mechanism for preventing vapor from flowing out is necessary. Therefore, a full length of a continuous furnace is long.

Hereinafter, an exemplary embodiment of the present disclosure will be described with reference to the drawings.

EXEMPLARY EMBODIMENT

Figure 1:
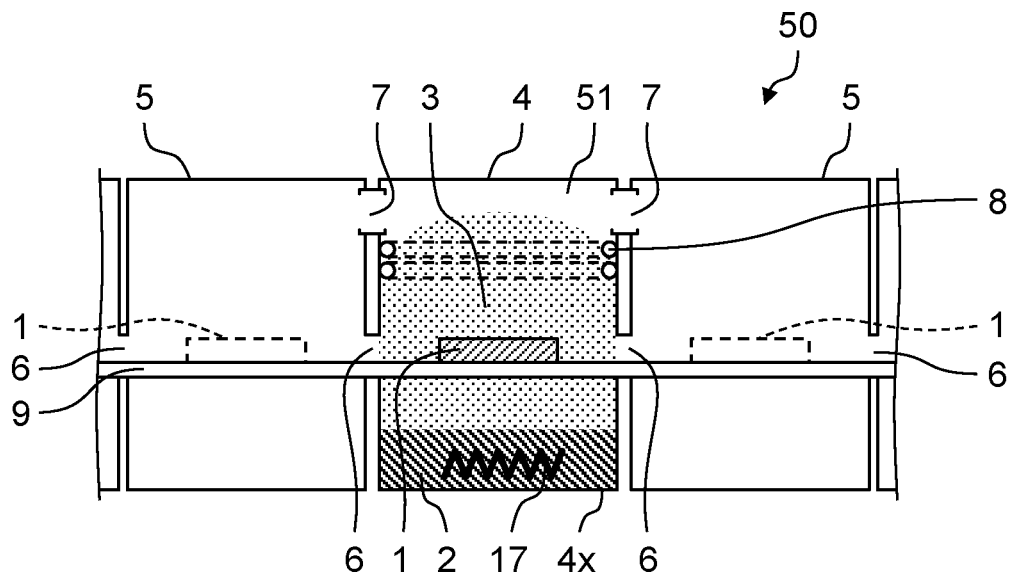
FIG. 1 is an explanatory view of a gas phase type heating device according to an exemplary embodiment.

FIG. 1 is an explanatory view of a gas phase type heating device according to the exemplary embodiment of the present disclosure. Gas phase type heating device 50 is a continuous furnace including at least one vapor heating furnace 4. Vapor heating furnace 4 includes first communicating portion 6 that is a loading/unloading portion, cooler 8, and second communicating portion 7 (connection portion).

Gas phase type heating device 50 is configured, for example, by serially connecting a plurality of heating furnaces 5. Gas phase type heating device 50 includes at least one vapor heating furnace 4 that heats object 1 by being given with latent heat of condensation of vapor 3 of heat transfer liquid 2. In a case of FIG. 1, heating furnaces 5, each of which is heating means that does not use vapor 3 of heat transfer liquid 2 caused by hot air circulation, are disposed in front and back of vapor heating furnace 4 (the right and the left in FIG. 1) so as to communicate with vapor heating furnace 4. An example of the heat transfer liquid includes an electrically insulating fluorine-based inert liquid.

Vapor heating furnace 4 has, in the vicinity of a bottom surface, tub $4x$ that holds a predetermined amount of heat transfer liquid 2. In tub $4x$, heating source 17 such as an electric heater for heating heat transfer liquid 2 to turn into vapor 3 is included.

Heating source 17 may adopt an immersion type configuration where a heating source is immersed and used in tub $4x$ of heat transfer liquid 2. Alternatively, heating source 17 may adopt a configuration of heating an entire wall surface of tub $4x$ or a part of the wall surface of tub $4x$. Heating source 17 requires a heating performance that is at least necessary to turn a larger amount of heat transfer liquid 2 into vapor 3 than the amount of vapor 3 of heat transfer liquid 2 that is cooled and liquefied by an inner wall surface of vapor heating furnace 4, cooler 8, or transporter 9. In addition, heating source 17 requires a heating performance greater than a total heating performance that is applied to heat transfer liquid 2 to form a necessary amount of vapor 3 to heat object 1 at a desired temperature rising speed. Transporter 9 is formed of, for example, a belt conveyor that penetrates the continuous furnace and can transport object 1.

The wall surface of vapor heating furnace 4 has at least two communicating portions (first communicating portion 6 and second communicating portion 7) for communicating with heating furnaces 5 disposed on an upstream side or a downstream side of the vapor heating furnace. First communicating portion 6 is an opening portion necessary for loading object 1 into vapor heating furnace 4 from upstream heating furnaces 5 or unloading object 1 from vapor heating furnace 4 to downstream heating furnaces 5. That is, first communicating portion 6 functions as, for example, a loading/unloading portion for allowing transporter 9 for loading and unloading object 1 to cause object 1 to pass through. Second communicating portion 7 is formed above first communicating portion 6 for loading and unloading object 1, in vapor heating furnace 4. Second communicating portion 7 communicates with each of heating furnaces 5 disposed on the upstream side and the downstream side of vapor heating furnace 4. In FIG. 1, cooler 8 is disposed between first communicating portion 6 disposed above transporter 9 for object 1 and second communicating portion 7 disposed above first communicating portion 6. A plurality of first communicating portions 6 are disposed along transporter 9 for object 1. A plurality of second communicating portions 7 are disposed on a straight line substantially parallel to transporter 9 for object 1. Herein, the upstream side refers to a side close to an inlet through which an object is loaded, and the downstream side refers to a side close to an outlet through which the object is unloaded. That is, the object is transported from the upstream side to the downstream side.

A cooling device that cools a surface of a pipe disposed along the inner wall surface of vapor heating furnace 4 by causing water cooled in an external space of vapor heating furnace 4 to flow into the pipe can be exemplified as cooler 8.

Herein, steps of a gas phase type heating method will be described.

First, before loading object 1 into gas phase type heating device 50, which is the continuous furnace, a vapor phase of vapor 3 is formed and increased in vapor heating furnace 4 by heating heat transfer liquid 2 in tub $4x$ with heating source 17 and giving latent heat of gasification for continuously turning heat transfer liquid 2 into vapor 3, as preparation for heating. At an early state of operation of heating source 17, a temperature of each part in vapor heating furnace 4 is equal to or lower than a boiling point of heat transfer liquid 2. Therefore, vapor 3 of heat transfer liquid 2, which is in contact with each part in vapor heating furnace 4, gives latent heat of condensation to each part in contact with the vapor and is liquefied. Then, liquefied heat transfer liquid 2 falls to a lower portion of vapor heating furnace 4 due to its own weight, and is collected by tub $4x$ of heat transfer liquid 2. By repeating this, each part in vapor heating furnace 4 is gradually heated by receiving the latent heat of condensation of heat transfer liquid 2, and subsequently reaches a boiling temperature of heat transfer liquid 2.

Consequently, a boundary surface between an atmospheric phase in vapor heating furnace 4 and a vapor phase of vapor 3 of heat transfer liquid 2 moves gradually upwards, and reaches cooler 8. Cooler 8 adjusts a temperature with water so as to be a constant temperature for the purpose of cooling vapor 3 of heat transfer liquid 2, which is in contact with the cooler, and thereby liquefying and collecting the vapor. This water is introduced into the pipe from outside vapor heating furnace 4. Therefore, the water brings latent heat of condensation generated by contacting with vapor 3 of heat transfer liquid 2 out to the external space of vapor heating furnace 4, and thus a temperature of a surface of the pipe does not reach the boiling point of heat transfer liquid 2. Consequently, the boundary surface between the atmospheric phase in vapor heating furnace 4 and the vapor phase of vapor 3 of heat transfer liquid 2 reaches a height of cooler 8 and is held in the vicinity of the wall surface of vapor heating furnace 4. Since the specific gravity of vapor 3 of heat transfer liquid 2 is greater than the specific gravity of the atmosphere, as vapor 3 in the vicinity of the wall surface is liquefied, also vapor 3 in the vicinity of a center of vapor heating furnace 4 moves toward the wall surface and is cooled by cooler 8. That is, since vapor 3 of heat transfer liquid 2 is unlikely to reach a space above cooler 8, the space above cooler 8 becomes space 51 where only a saturated vapor pressure component of vapor 3 of heat transfer liquid 2 at a temperature of the space can exist and there is an extremely small amount of vapor 3 of heat transfer liquid 2 compared to a vapor phase below cooler 8.

An inlet shape of first communicating portion 6, which is an opening for transporter 9 for object 1, or a shape inside the communicating portion, has a structure with a large inlet loss or a large pressure loss such that vapor 3 of heat transfer liquid 2 is unlikely to flow to adjacent heating furnace 5 communicating with the upstream side or the downstream side. In addition, an inlet shape of second communicating portion 7 above cooler 8 or a shape inside the communicating portion has a structure with a small inlet loss or a small pressure loss such that a gas with a small amount of vapor 3 of heat transfer liquid 2, which exists in the space above cooler 8, is likely to flow.

Due to such a configuration, heat transfer liquid 2 is heated in vapor heating furnace 4, and a pressure difference between vapor heating furnace 4 and heating furnaces 5 in front and back of the vapor heating furnace occurs due to a pressure rise in vapor heating furnace 4 caused by volume expansion with a phase change from a liquid to a gas, which is becoming vapor 3. However, in the configuration, exchange of a gas between vapor heating furnace 4 and heating furnaces 5 in front and back of the vapor heating furnace is performed preferentially through second communicating portion 7 over first communicating portion 6. That is because second communicating portion 7 is disposed in space 51 which is above cooler 8 and in which a gas with a small amount of vapor 3 of heat transfer liquid 2 exists. Consequently, the pressure difference is eliminated. At this time, vapor 3 of heat transfer liquid 2 is unlikely to flow into first communicating portion 6 which is on transporter 9 for object 1 below cooler 8 and has a structure with a large inlet loss. Consequently, vapor 3 of heat transfer liquid 2 is prevented from flowing out from vapor heating furnace 4 to adjacent heating furnaces 5 in front and back of the vapor heating furnace.

Figure 2:
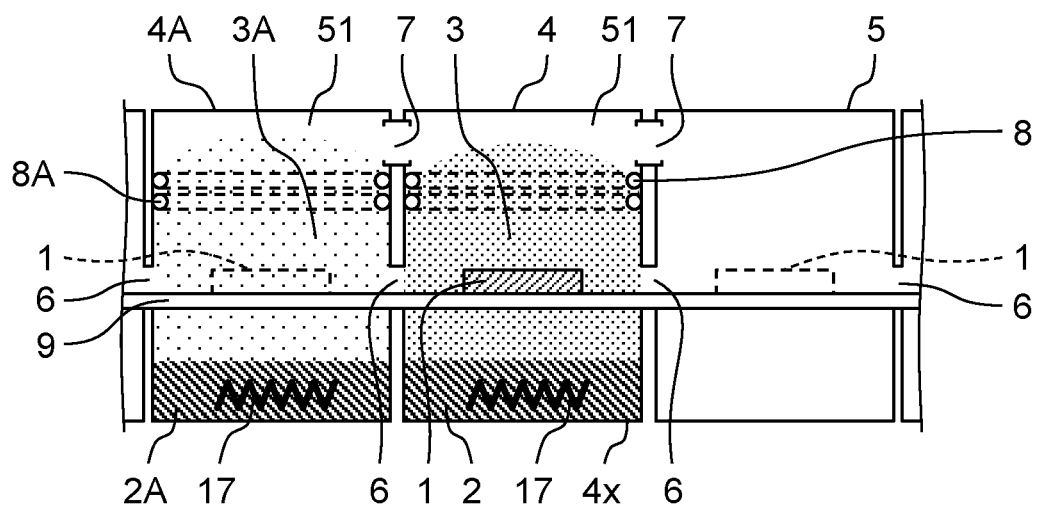
FIG. 2 is an explanatory view of the gas phase type heating device according to the exemplary embodiment.

FIG. 2 is an explanatory view in a case where vapor heating furnace 4A for heating, in which latent heat of condensation of heat transfer liquid 2 is used, is connected also to an upstream side adjacent to vapor heating furnace 4.

Another heat transfer liquid 2A having a boiling point different from a boiling point of heat transfer liquid 2 in vapor heating furnace 4 is used in upstream vapor heating furnace 4A in some cases. Instead, as another example, specifications of heat transfer liquid 2 in vapor heating furnace 4 and specifications of heat transfer liquid 2A are the same, and the amount of heat energy given to heat transfer liquid 2A is controlled. Accordingly, vapor heating furnace 4A, in which a concentration of vapor 3A of heat transfer liquid 2A is made different from a concentration of vapor 3 of heat transfer liquid 2 in vapor heating furnace 4, may be used.

Characteristics related to configurations of the communicating portions between vapor heating furnace 4 and vapor heating furnace 4A (first communicating portion 6 and second communicating portion 7) may be the same as in the case of FIG. 1. That is, there are two communicating portions between vapor heating furnace 4 and vapor heating furnace 4A. First communicating portion 6 for loading object 1 has a shape with a large inlet loss, and second communicating portion 7 above cooler 8A has a small inlet loss. Also in upstream vapor heating furnace 4A, vapor 3A of heat transfer liquid 2A is cooled and liquefied by cooler 8A provided in the vicinity of a wall surface of vapor heating furnace 4A, and falls downwards in vapor heating furnace 4A. Therefore, a space above cooler 8A becomes space 51 where there is an extremely small amount of vapor 3A of heat transfer liquid 2A. Accordingly, when a pressure difference has occurred between vapor heating furnace 4 and vapor heating furnace 4A, the pressure difference occurred between adjacent furnace bodies is eliminated by exchange of a gas in second communicating portion 7 disposed in space 51 which is above cooler 8A and in which there is an extremely small amount of vapor 3A. Consequently, flowing-out and flowing-in of vapor 3A of heat transfer liquid 2A, which has a different boiling point, between the adjacent furnace bodies, or mutual interference caused by a concentration difference in vapor 3A can be reduced. Herein, a gas with only vapor or a gas including a large amount of vapor is movable in first communicating portion 6. On the contrary, in second communicating portion 7 disposed above cooler 8A, a gas without vapor or a gas including a smaller amount of vapor than first communicating portion 6 is movable from first communicating portion 6.

FIGS. 3A to 3D illustrate an example of a method of loading object 1 into the continuous furnace. In FIGS. 3A to 3D, in the continuous furnace, inlet chamber 15, first vapor heating furnace 4a, heating furnace 5, second vapor heating furnace 4b, cooler 19, and outlet chamber 16 are serially disposed to be adjacent to each other in this order from the upstream side to the downstream side (that is, from a left end to a right end in FIGS. 3A to 3D).

As for a pressure change between first vapor heating furnace 4a and second vapor heating furnace 4b, a pressure difference between first vapor heating furnace 4a or second vapor heating furnace 4b and heating furnace 5 that communicates with first vapor heating furnace 4a or second vapor heating furnace 4b on the upstream side or the downstream side thereof can be eliminated by the configuration of FIG. 1. However, there is a case where a pressure in first vapor heating furnace 4a or second vapor heating furnace 4b is maintained at a state higher than the atmospheric pressure outside the furnace, that is, a case where there is a difference between an overall pressure in the furnace, also including a pressure in heating furnace 5, and the atmospheric pressure of the external space of the furnace. In this case, the pressure difference can be eliminated by providing a space that temporarily shields an internal space of a furnace body from the outside of the furnace body in an inlet and an outlet of the furnace body.

Figure 3A:
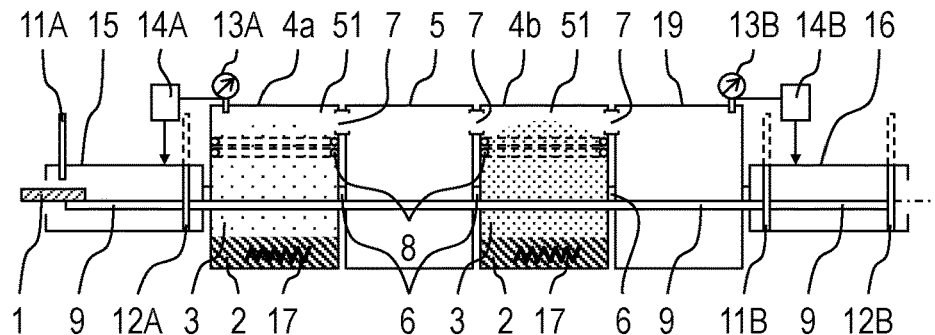
FIG. 3A is an explanatory view of a method of loading an object into the gas phase type heating device according to the exemplary embodiment.

As illustrated in FIG. 3A, a configuration of a device having this shielding space can be executed by providing each of inlet chamber 15 on an inlet side of the furnace body and outlet chamber 16 on an outlet side of the furnace body. Each of inlet chamber 15 and outlet chamber 16 functions as a space that temporarily shields the internal space of the furnace body from the outside of the furnace body. Inlet chamber 15 has upstream inlet side shutter 11A and outlet side shutter 12A which can be opened and closed independently of each other. Outlet chamber 16 has upstream inlet side shutter 11B and outlet side shutter 12B which can be opened and closed independently of each other.

Hereinafter, a specific operation of inlet chamber 15 will be described.

Figure 3B:
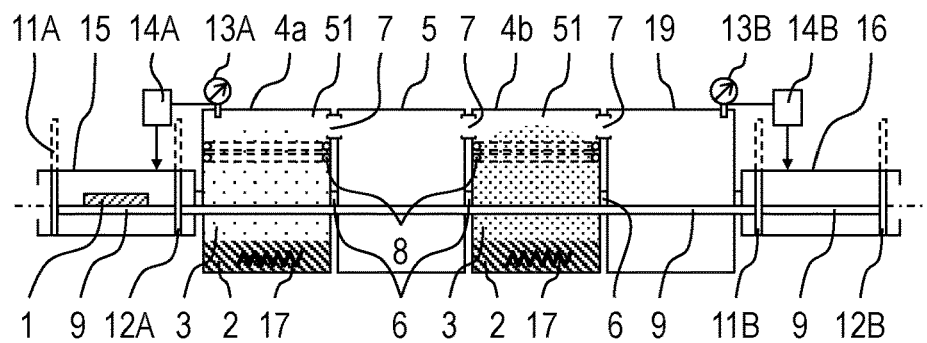
FIG. 3B is an explanatory view of the method of loading the object into the gas phase type heating device according to the exemplary embodiment.

First, in FIG. 3A, when loading object 1, inlet side shutter 11A which is on the upstream side of inlet chamber 15 is opened, and object 1 is loaded into inlet chamber 15 from outside the continuous furnace having the atmospheric pressure. At this time, outlet side shutter 12A is in a closed state. After object 1 is completely loaded into inlet chamber 15, inlet side shutter 11A is closed, and a state of FIG. 3B is caused. In the state of FIG. 3B, a space in inlet chamber 15 functions as a space that temporarily shields the internal space of the furnace body from the outside of the furnace body.

Herein, a pressure adjusting operation is performed in the state of FIG. 3B. That is, the atmosphere outside the furnace is introduced by pressure adjuster 14A such that a pressure difference is reduced based on a result of detection of a pressure in first vapor heating furnace 4a by pressure detector 13A disposed in first vapor heating furnace 4a. Accordingly, pressure adjuster 14A adjusts the pressure in inlet chamber 15 such that the pressure becomes the same as the pressure in first vapor heating furnace 4a.

Figure 3C:
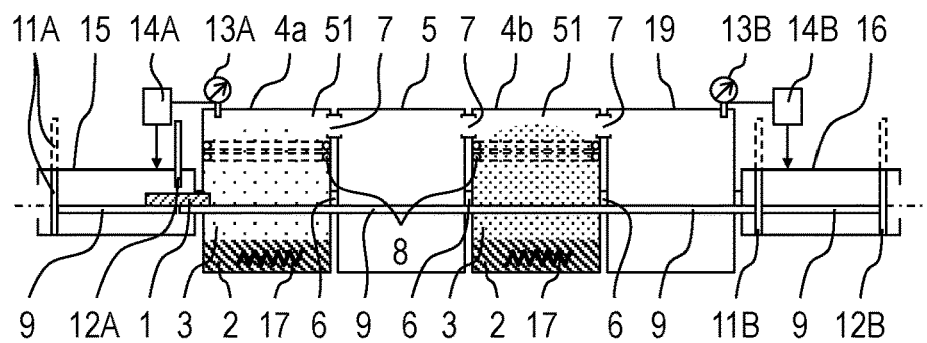
FIG. 3C is an explanatory view of the method of loading the object into the gas phase type heating device according to the exemplary embodiment.

After this pressure adjustment is completed, outlet side shutter 12A is opened with inlet side shutter 11A of inlet chamber 15 closed, and object 1 is delivered and loaded into first vapor heating furnace 4a as in FIG. 3C. At this time, the pressure in inlet chamber 15 and the pressure in first vapor heating furnace 4a are adjusted to become the same through the pressure adjusting operation. Therefore, there is a possibility of the occurrence of mixing of a gas according to a gas diffusion level while outlet side shutter 12A is opened. However, air flow does not occur. Therefore, it is possible to avoid vapor in first vapor heating furnace 4a flowing into inlet chamber 15 as air flow, and conversely, outside air in inlet chamber 15 flowing into first vapor heating furnace 4a as air flow.

Figure 3D:
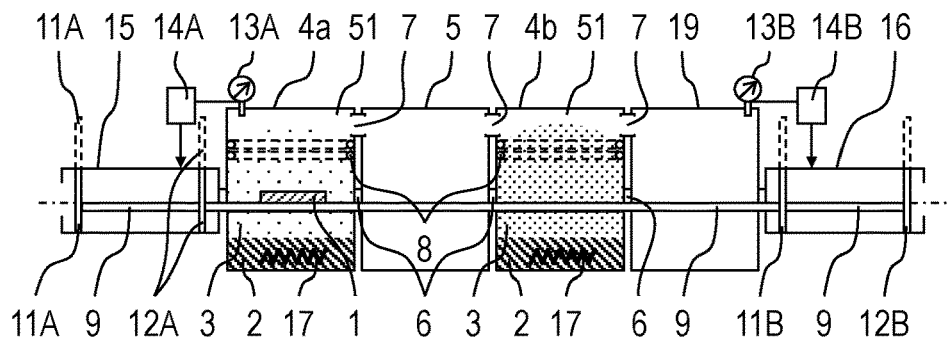
FIG. 3D is an explanatory view of the method of loading the object into the gas phase type heating device according to the exemplary embodiment.

After loading object 1, outlet side shutter 12A is closed, and inlet chamber 15 and first vapor heating furnace 4a are shielded as in FIG. 3D.

After then, object 1 reaches cooler 19 from first vapor heating furnace 4a via heating furnace 5 and second vapor heating furnace 4b.

On the other hand, when unloading object 1 from cooler 19 which is a downstream end portion of the continuous furnace, inlet side shutter 11B, which is on the upstream side of outlet chamber 16, and outlet side shutter 12B come into a closed state. The atmosphere outside the furnace is introduced by pressure adjuster 14B such that a pressure difference is reduced based on a result of detection of a pressure in cooler 19 by pressure detector 13B. Accordingly, pressure adjuster 14B adjusts a pressure in outlet chamber 16 such that the pressure becomes the same as the pressure in cooler 19.

After this pressure adjustment is completed, inlet side shutter 11B is opened with outlet side shutter 12B closed, and object 1 is loaded into outlet chamber 16 from cooler 19.

After the object is completely loaded, inlet side shutter 11B is closed. After then, outlet side shutter 12B is opened, and object 1 is delivered and unloaded to the outside of the continuous furnace.

Accordingly, when loading object 1 into the continuous furnace, and when unloading the object to the outside of the continuous furnace, it is possible to avoid vapor 3 of heat transfer liquid 2 in the continuous furnace flowing outside the continuous furnace without depending on a pressure in the continuous furnace.

It is also possible to make pressure adjustment in inlet chamber 15 and outlet chamber 16 unnecessary by maintaining a pressure change amount caused by volume expansion as a result of gasification of heat transfer liquid 2 in first vapor heating furnace 4a and second vapor heating furnace 4b at the atmospheric pressure.

Figure 4:
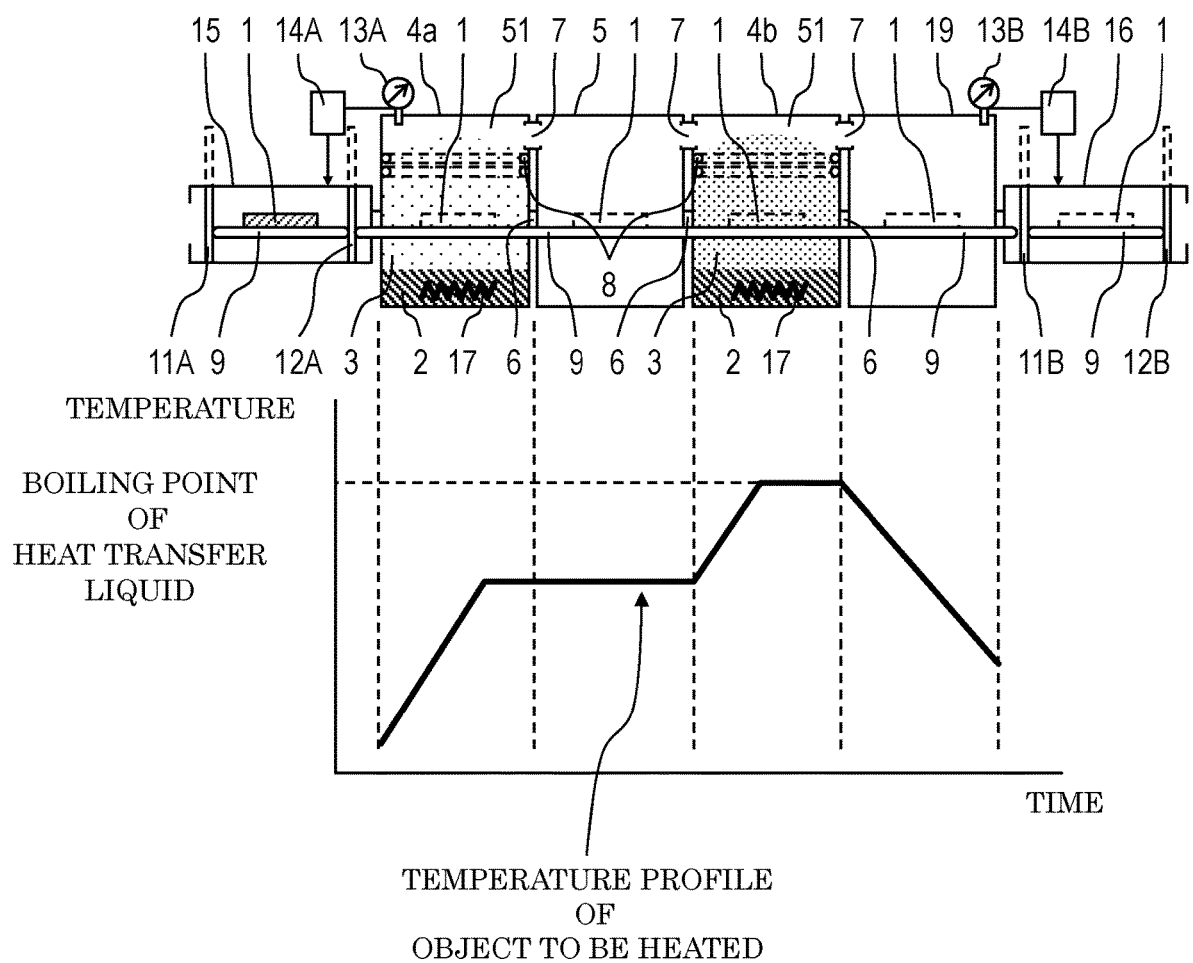
FIG. 4 is an explanatory view of a temperature profile of the gas phase type heating device according to the exemplary embodiment.

FIG. 4 is an explanatory view of a temperature profile in a case where the gas phase type heating device of FIG. 3A has transporter 9 that continuously transports object 1 at a constant speed from the inlet to the outlet in the exemplary embodiment of the present disclosure. As for heating from the loading of object 1, object 1 is heated to a desired temperature as a preheating step in first vapor heating furnace 4a. A preheating temperature is maintained by hot air circulation heating in next heating furnace 5. After then, heating processing is terminated by further raising to a desired temperature as a main heating step in second vapor heating furnace 4b. After then, the temperature profile is completed by cooler 19 cooling object 1.

Figure 5:
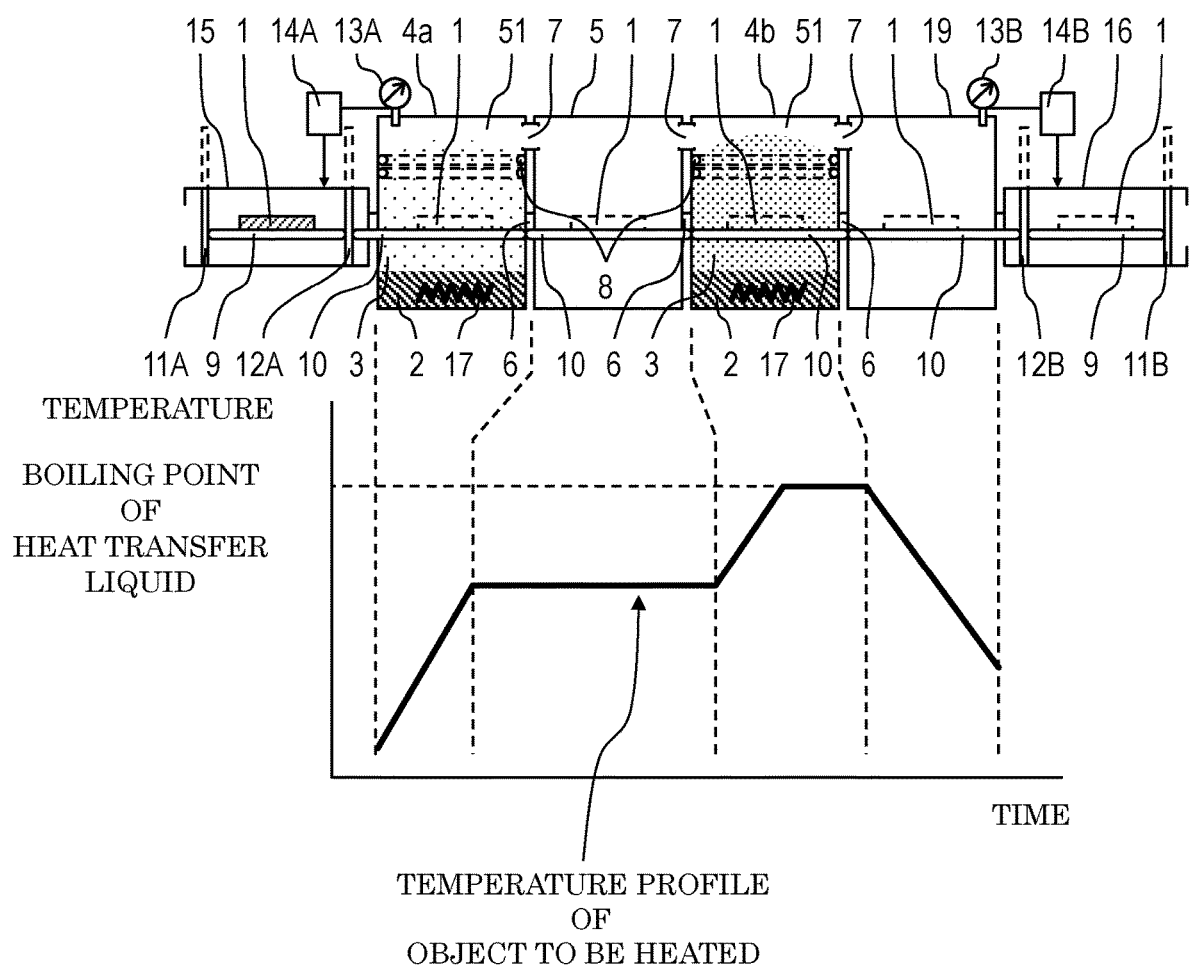
FIG. 5 is an explanatory view of a temperature profile of a gas phase type heating device according to another example of the exemplary embodiment.

FIG. 5 is an explanatory view of a temperature profile in a case where transporter 10 for object 1 from the inlet to the outlet is configured to be differentiated for each of first vapor heating furnace 4a, second vapor heating furnace 4b, and heating furnace 5 in a gas phase type heating device according to another example of the present disclosure. By adopting transporter 10, which is differentiated for each of first vapor heating furnace 4a, second vapor heating furnace 4b, and heating furnace 5, such as a conveyor belt, a speed at which object 1 moves in each of first vapor heating furnace 4a, second vapor heating furnace 4b, and heating furnace 5 can be changed, and it is also possible to stop the object in some cases. Consequently, the object can be held for a desired time at each of first vapor heating furnace 4a, second vapor heating furnace 4b, and heating furnace 5.

Therefore, a heating step can be made longer or shorter than in the temperature profile of the case of FIG. 4. Accordingly, for example, a temperature maintained time in heating furnace 5 can be made longer as in the temperature profile shown in FIG. 5. Alternatively, although not shown, a time after reaching a peak temperature in first vapor heating furnace 4a and second vapor heating furnace 4b can be changed. Consequently, it is possible to create a more complicated temperature profile.

Figure 6:
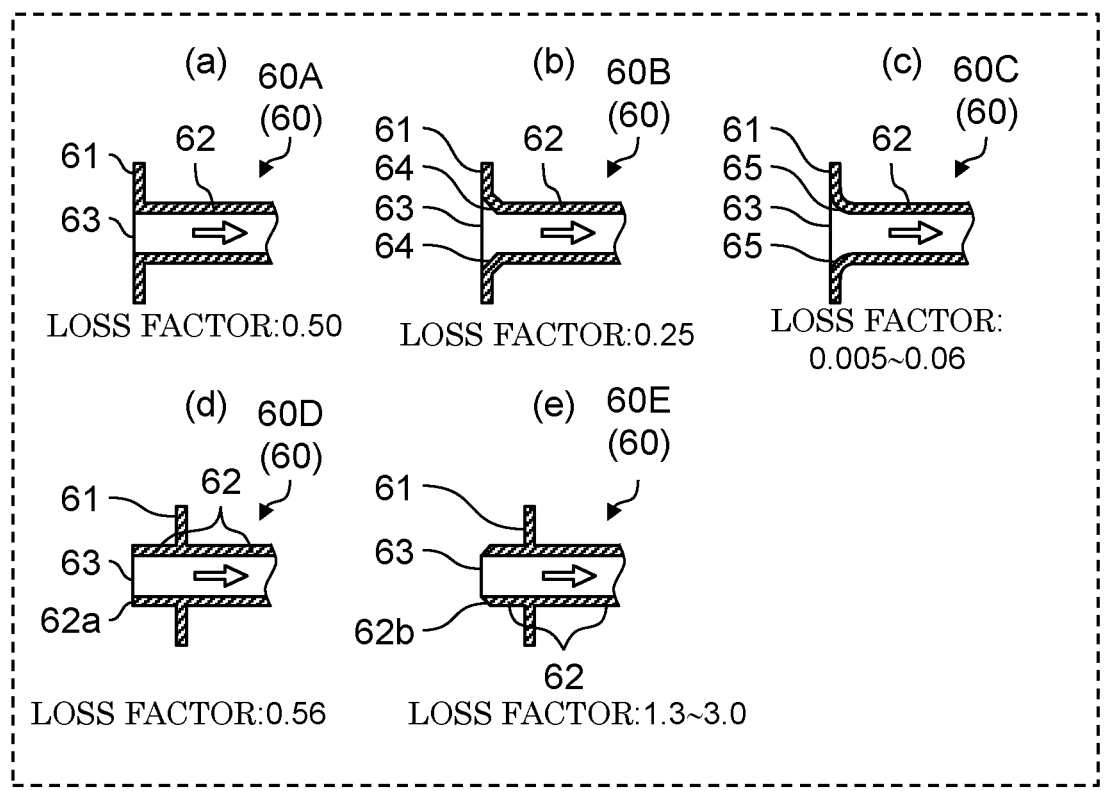
FIG. 6 is a view illustrating an inlet shape of a communicating portion and a loss factor of air flow of the inlet shape according to the exemplary embodiment.

FIG. 6 illustrates an example of an inlet-side shape of communicating portion 60 for applying to each of first communicating portion 6 and second communicating portion 7, that is, each of communicating portions 60A to 60E and a loss factor in each shape.

In FIG. 6(a), communicating portion 60A is configured by tube 62 which extends upright from furnace wall 61 and has opening portion 63 through which object 1 goes in and out. Preferably, tube 62 is orthogonal to furnace wall 61.

In FIG. 6(b), as FIG. 6(a), communicating portion 60B is configured by tube 62 which extends upright from furnace wall 61 with respect to furnace wall 61 and has opening portion 63 through which object 1 goes in and out. Preferably, tube 62 is orthogonal to furnace wall 61. What is different from FIG. 6(a) is that inclined flat surface 64 having a conical shape is formed at a connecting portion between opening portion 63 and tube 62, which is on the periphery of opening portion 63.

Communicating portion 60C of FIG. 6(c) is different from FIG. 6(a) in that conical surface 65 of which a section is curved is formed at the connecting portion between opening portion 63 and tube 62, which is on the periphery of opening portion 63.

In FIG. 6(d), communicating portion 60D is configured by tube 62 which penetrates furnace wall 61 to extend to both sides of furnace wall 61 and has opening portion 63 through which object 1 goes in and out. Preferably, tube 62 is orthogonal to furnace wall 61. End surface 62a of tube 62 is a surface orthogonal to an axial direction of tube 62 (long-axis direction).

In FIG. 6(e), communicating portion 60E is configured by tube 62 which penetrates furnace wall 61 to extend to both sides of furnace wall 61 and has opening portion 63 through which object 1 goes in and out. Preferably, tube 62 is orthogonal to furnace wall 61. End surface 62b of tube 62 is an inclined surface that is inclined to extend as going further away from opening portion 63, with respect to the axial direction of tube 62.

Making an upstream inlet shape (inlet shape) and a downstream inlet shape (inlet shape) of first communicating portion 6 the same allows easy control since inlet losses can be made the same. Similarly, making an upstream inlet shape (inlet shape) and a downstream inlet shape (inlet shape) of second communicating portion 7 the same allows easy control since inlet losses can be made the same.

Ease of flow of air flow to opening portion 63 can be determined by an inlet loss. Therefore, by defining the inlet shapes of first communicating portion 6 and second communicating portion 7, a difference is made between an inlet loss of first communicating portion 6 and an inlet loss of second communicating portion 7, and the inlet loss of second communicating portion 7 can be made smaller than the inlet loss of first communicating portion 6. Accordingly, the exchange of air flow between furnace bodies adjacent to second communicating portion 7 can be preferentially performed over first communicating portion 6. Inlet loss ΔP is determined from a loss factor and a density and a flow speed of a fluid, and the following equation is acquired.

Inlet loss ΔP=Loss factor×Density×(Flow speed)$^2$/2

A configuration where a difference in an inlet loss is made between first communicating portion 6 and second communicating portion 7, which shows ease of flow of air flow to opening portion 63, and the inlet loss of second communicating portion 7 is made small is described as follows. For example, second communicating portion 7 has a configuration of having an inlet-side opening surrounded by a surface that is inclined or curved with respect to an axial direction of the second communicating portion (long-axis direction). First communicating portion 6 has a configuration of having an inlet-side opening surrounded by a surface orthogonal to the axial direction (long-axis direction). Due to this con-figuration, a pressure loss of second communicating portion 7 can be made smaller than a pressure loss of first communicating portion 6.

Figure 7:
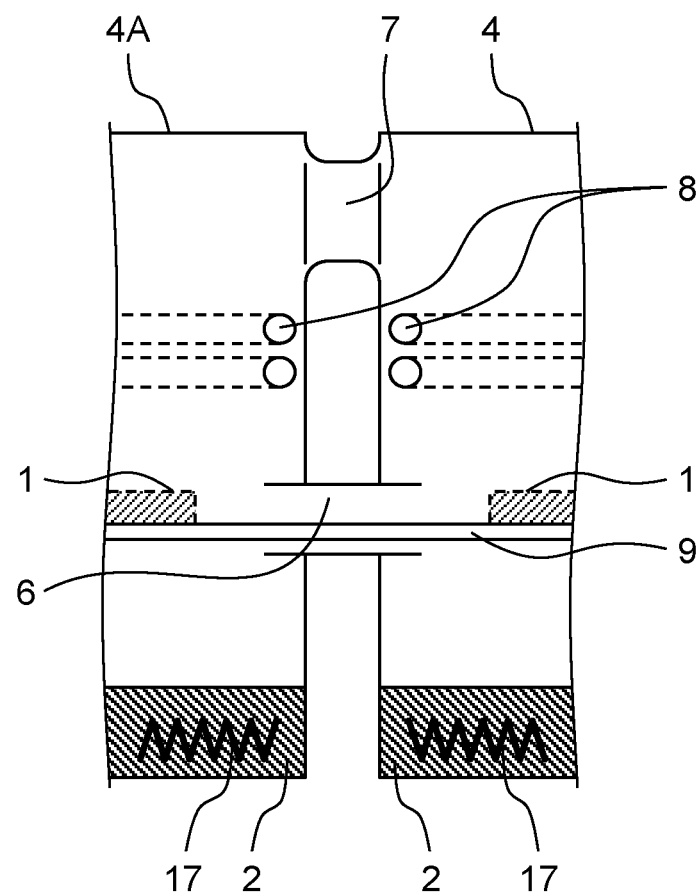
FIG. 7 is an enlarged explanatory view of the communicating portion of the gas phase type heating device according to the exemplary embodiment.
Figure 8A:
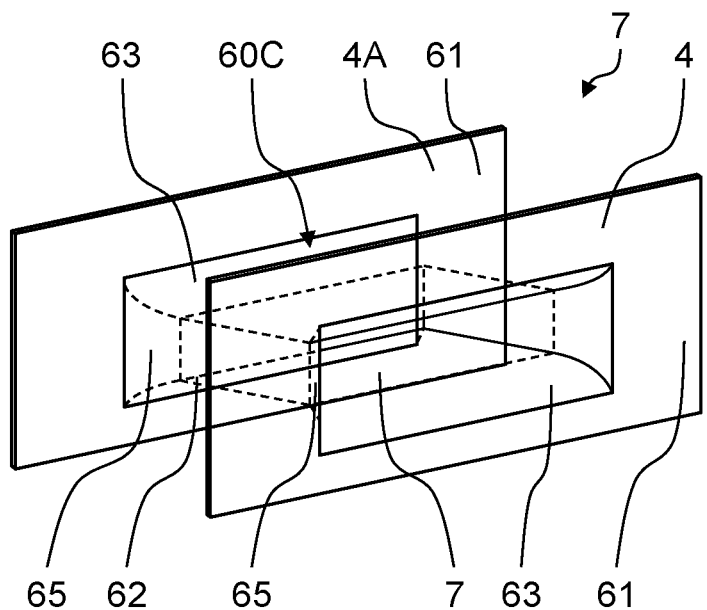
FIG. 8A is an enlarged view of a second communicating portion in a configuration of FIG. 7.
Figure 8B:
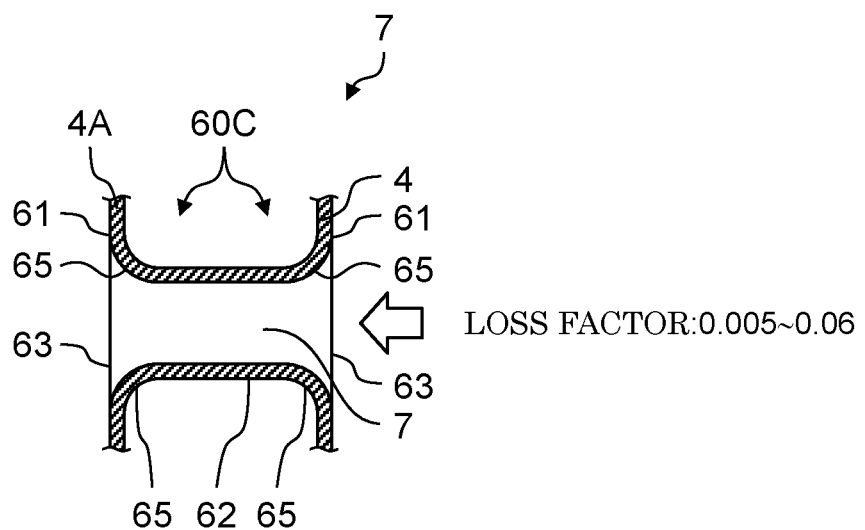
FIG. 8B is a sectional view of the second communicating portion of FIG. 8A.
Figure 9A:
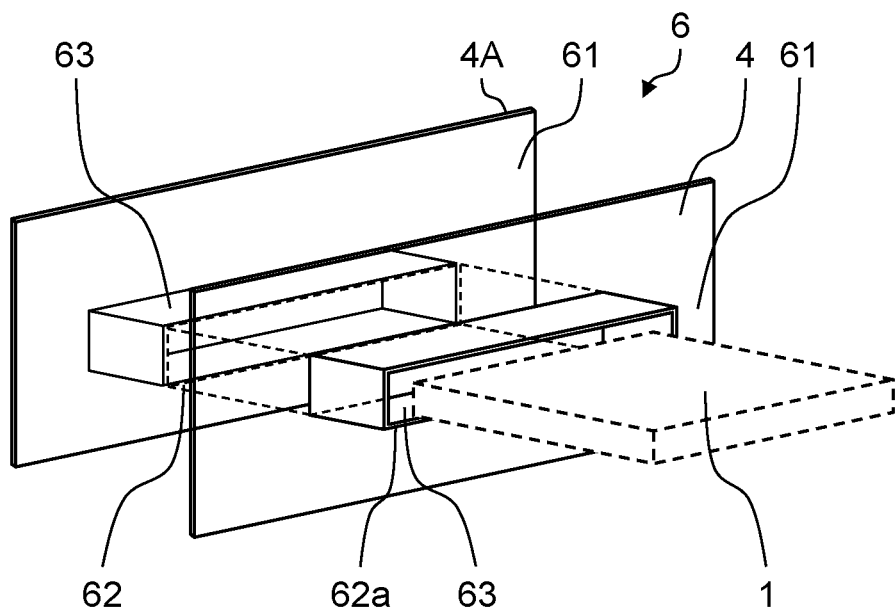
FIG. 9A is an enlarged view of a first communicating portion in the configuration of FIG. 7.
Figure 9B:
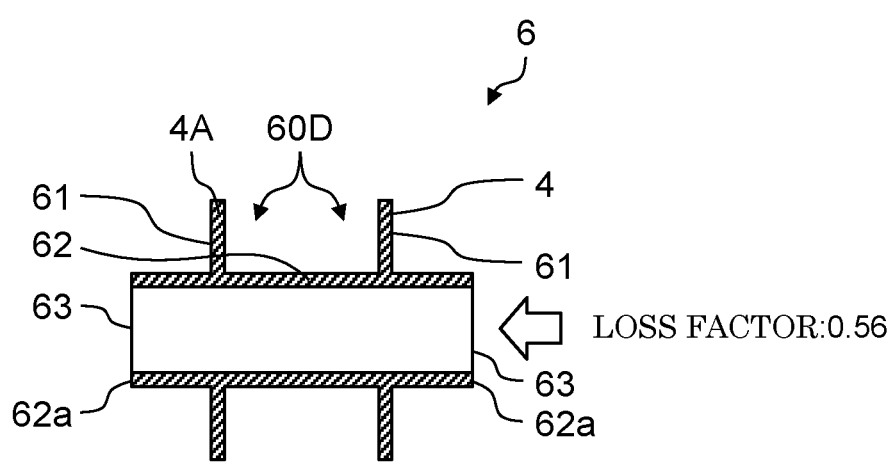
FIG. 9B is a sectional view of the first communicating portion of FIG. 9A.

FIG. 7 is a detailed explanatory view related to first communicating portion 6 and second communicating portion 7 of FIG. 2, which are in between vapor heating furnace 4 and adjacent upstream vapor heating furnace 4A. FIG. 8A is a detailed view of a shape of second communicating portion 7 above cooler 8 of FIG. 7. FIG. 8B is a longitudinal sectional view of FIG. 8A. FIG. 9A is a detailed view of a shape of first communicating portion 6. FIG. 9B is a longitudinal sectional view of FIG. 9A.

Herein, the equation of an inlet loss is applied in a configuration of FIG. 7.

First, as for a density, in a case of vapor heating furnace 4 of FIG. 7, vapor concentrations of heat transfer liquid 2 above and below cooler 8 are different from each other. Since the specific gravity of vapor of heat transfer liquid 2 is greater than the specific gravity of the atmosphere, a gas existing in the space above cooler 8 has a lower density. From a perspective of a density, second communicating portion 7 disposed in the space above cooler 8 has a smaller numerical value of an inlet loss than first communicating portion 6 has. In addition, since air flow rarely occurs and is extremely small in both of first communicating portion 6 and second communicating portion 7 when a state in the furnace is a stable state, flow speeds are almost the same.

Accordingly, a value of an inlet loss depends significantly on the size of a loss factor in the equation herein, since a shape in FIG. 8A, which illustrates second communicating portion 7 of FIG. 7, decreases an inlet loss, communicating portion 60C having the shape in FIG. 6(c) is adopted. In this case, a loss factor of an inlet loss of second communicating portion 7 is equal to or larger than 0.005 and is equal to or smaller than 0.06. Herein, since a shape in FIG. 9A, which illustrates first communicating portion 6 of FIG. 7, increases an inlet loss, communicating portion 60D having the shape in FIG. 6(d) is adopted. A loss factor of an inlet loss of first communicating portion 6 in this case is 0.56. Accordingly, in a case of the configuration of FIG. 7, the inlet loss of second communicating portion 7, which is a communicating portion above cooler 8, is approximately 10 times or more and 100 times or less smaller than the inlet loss of first communicating portion 6, which is a communicating portion below cooler 8, when loss factors are compared, and also the second communicating portion has a smaller gas density. Therefore, the inlet loss ΔP is a value that is 10 times or more and even 100 times or more smaller. Consequently, the exchange of a gas preferentially occurs in second communicating portion 7 which is above cooler 8. Accordingly, a pressure difference between vapor heating furnace 4 and vapor heating furnace 4A is eliminated.

Figure 10:
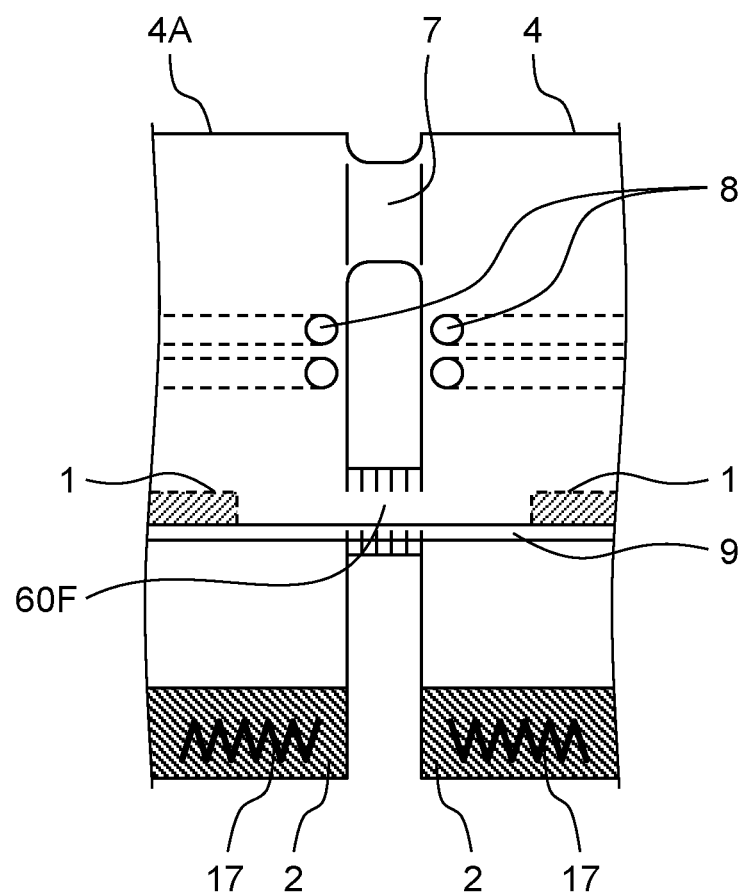
FIG. 10 is an enlarged explanatory view of a communicating portion of a gas phase type heating device according to another example of the exemplary embodiment.
Figure 11A:
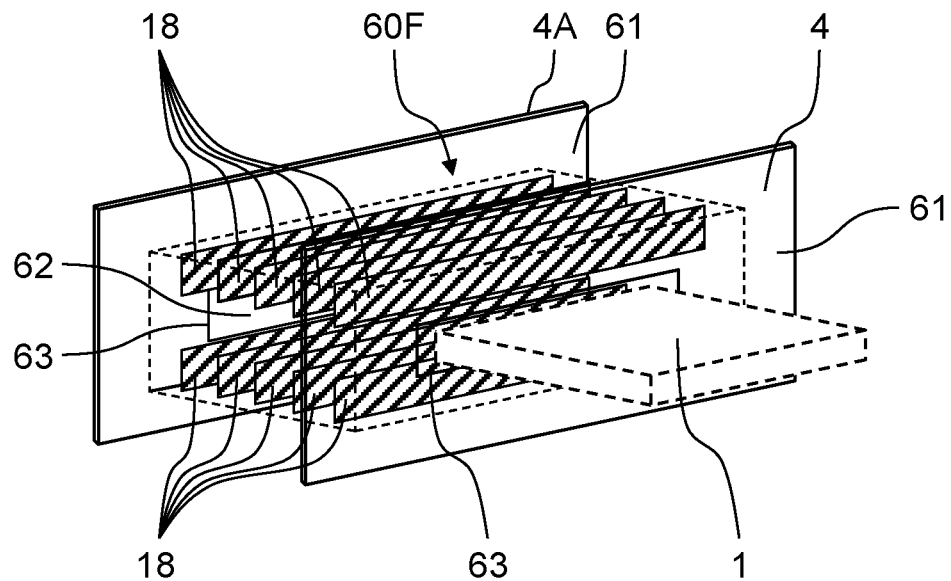
FIG. 11A is an enlarged view of a first communicating portion in a configuration of FIG. 10.
Figure 11B:
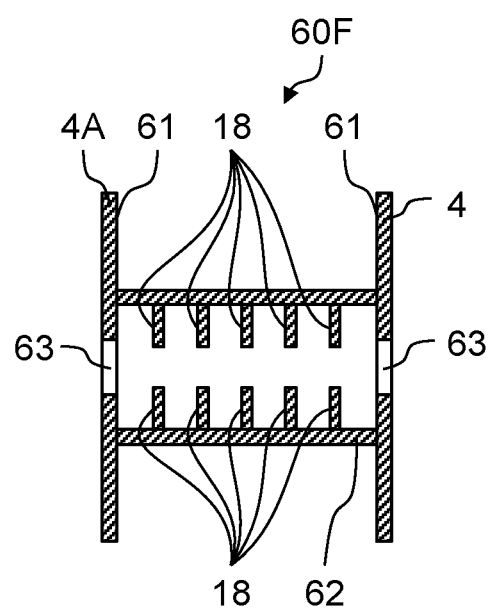
FIG. 11B is a sectional view of the first communicating portion of FIG. 11A.

FIG. 10 is an explanatory view of another example related to a communicating portion between vapor heating furnace 4 and adjacent vapor heating furnace 4A. A shape of second communicating portion 7 of FIG. 10 is the same as in FIG. 8A. In FIGS. 11A and 11B, first communicating portion 60F is used instead of first communicating portion 6. FIG. 11A is a detailed explanatory view of a shape of first communicating portion 60F for a transporter of FIG. 10. FIG. 11B is a longitudinal sectional view of FIG. 11A. In the shapes in FIG. 6, in which loss factors that determine inlet losses are written, a loss factor of a structure of FIG. 11B is not shown. However, this shape is a shape that can be called a labyrinth structure in which a plurality of pleated annular protrusions 18 are consecutively disposed over almost an entire path of first communicating portion 60F. In other words, first communicating portion 60F can be combined with any structure of communicating portions 60A to 60E described above. This structure of first communicating portion 60F is already widely used in mainly inlets and outlets of various types of furnaces, and is a structure that makes it difficult for air flow to flow by pleated protrusions 18 causing a large pressure loss with respect to flow of air flow in first communicating portion 60F without completely shielding a space in a furnace and an external space. It is possible to make pleated protrusions 18 of the labyrinth structure of a flexible material. In this case, even when protrusions 18 overhang transporters 9 and 10 for object 1, the transportation of object 1 is not obstructed.

In FIGS. 7 and 10, to describe ease of flow of air flow according to differences in an inlet loss and a pressure loss, a case where opening areas of longitudinal sections of first communicating portion 6 and second communicating portion 7 are the same is assumed as in an assumption of a loss factor according to an inlet shape in FIG. 6. However, to further increase effects, it is more preferable to make the opening area of the longitudinal section of second communicating portion 7 larger than the opening area of the longitudinal section of first communicating portion 6.

A pressure difference between vapor heating furnace 4 and heating furnace 5 adjacent to each other in second communicating portion 7 with a small pressure loss in space 51 where there is a small amount of vapor 3 can be eliminated through the configuration. Consequently, the movement of vapor 3 in first communicating portion 6, which has a large amount of vapor 3 and is the loading/unloading portion for object 1, can be reduced. Accordingly, it is possible to reduce the movement and flowing-out of vapor 3 in vapor heating furnace 4.

That is, even when a furnace, in which vapor heating furnace 4 and heating furnace 5 are connected to each other at a narrow interval, is adopted in the exemplary embodiment, a special mechanism for preventing vapor from flowing out is unnecessary in second communicating portion 7 between vapor heating furnace 4 (or vapor heating furnace 4A, first vapor heating furnace 4a, and second vapor heating furnace 4b) that heats object 1 by using latent heat of condensation of vapor 3 of heat transfer liquid 2 and adjacent heating furnace 5. Thus, a pressure difference between vapor heating furnaces 4 and 4A, first vapor heating furnace 4a, or second vapor heating furnace 4b and heating furnace 5 can be reduced in second communicating portion 7 with a small pressure loss in space 51 where there is a small amount of vapor 3. Consequently, the movement of vapor 3 in first communicating portion 6, which has a large amount of vapor 3 and is a transporting surface for object 1, can be reduced. Accordingly, a vapor concentration of heat transfer liquid 2 in vapor heating furnace 4 and a heating performance according to latent heat of condensation can be stably controlled by vapor heating furnace 4.

Figure 12:
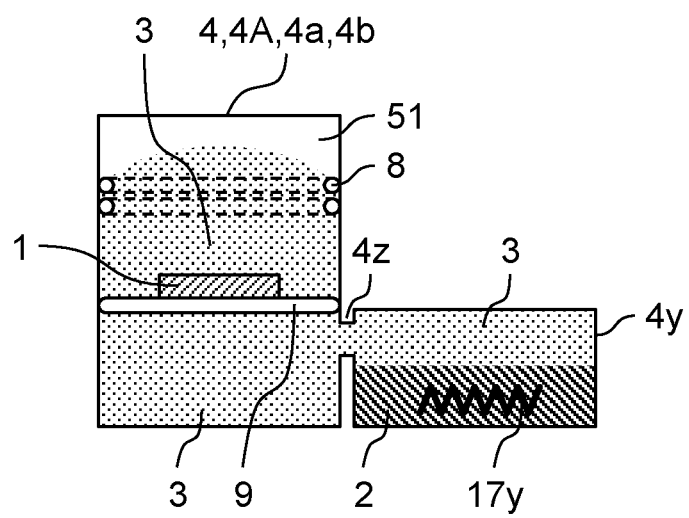
FIG. 12 is an explanatory view of a gas phase type heating device according to still another example of the exemplary embodiment.
Figure 13:
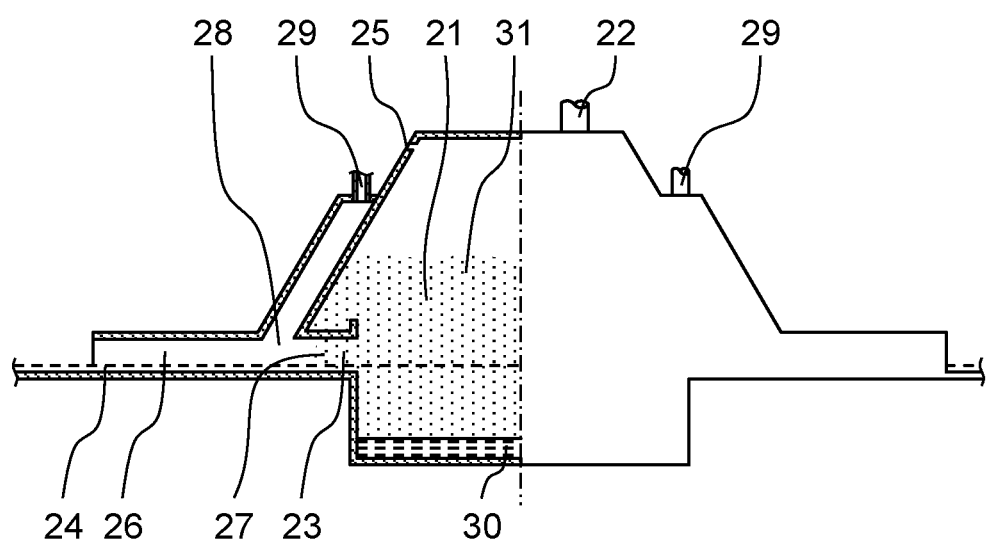
FIG. 13 is an explanatory view of a gas phase type heating device of the related art.

The present disclosure is not limited to the exemplary embodiment, and can be executed through other various aspects. For example, although heating source 17 is disposed in tub 4x which is in the lower portion inside vapor heating furnace 4, the present disclosure is not limited to this configuration. For example, as illustrated in FIG. 12, vapor generator 4y may be connected to the outside of vapor heating furnace 4 via connector 4z. Then, vapor 3 may be generated by heating source 17y of vapor generator 4y heating heat transfer liquid 2, and generated vapor 3 may be supplied to vapor heating furnace 4 via connector 4z. FIG. 12 is an explanatory view of vapor heating furnace 4 which is seen from a direction that is different from a transporting direction of object 1 by 90 degrees.

By appropriately combining any examples out of the various examples, effects of each example can be achieved. In addition, it is possible to combine the examples, and it is also possible to combine characteristics of the different examples.

As described above, in the gas phase type heating method and the gas phase type heating device of the present disclosure, a vapor heating furnace that heats an object by using latent heat of condensation of vapor of a heat transfer liquid and a special mechanism for preventing vapor from flowing out are unnecessary even when a furnace in which a plurality of heating furnaces are connected to each other at a narrow interval is adopted.

Therefore, a pressure difference between the heating furnaces adjacent to each other in a communicating portion with a small pressure loss in a region where there is a small amount of vapor can be reduced. Consequently, the movement of vapor in the communicating portion, which has a large amount of vapor and is a transporting surface for the object, can be reduced. Accordingly, a vapor concentration of the heat transfer liquid in the vapor heating furnace and a heating performance according to latent heat of condensation can be stably controlled by the vapor heating furnace.

The gas phase type heating method and the gas phase type heating device according to an aspect of the present disclosure can increase and decrease a concentration of vapor of a heat transfer liquid that transfers heat to an object to adjust the concentration and to make concentration uniform and can increase and decrease a temperature rising speed. In addition, when heating the object, a difference in a heating performance does not occur according to a place and time, and it is possible to heat an object with a three-dimensional shape through uniform heat transfer. Therefore, as a heating method and a heating device that uniformly heats a three-dimensional object, the aspect of the present disclosure can be applied to a heating processing method and a heating processing device that performs various types of heating processing by a drying furnace, a curing furnace, or a reflow furnace in an industrial product or home appliances manufacturing step or a various types of electronic components manufacturing step.

What is claimed is:

1. A gas phase type heating method of heating an object by a continuous furnace including a vapor heating furnace that heats the object by using latent heat of condensation of vapor of a heat transfer liquid and a heating furnace that communicates with the vapor heating furnace, the method comprising:
    loading the object into the vapor heating furnace or the heating furnace via a loading/unloading portion that allows the vapor heating furnace and the heating furnace to communicate with each other;
    cooling the vapor of the heat transfer liquid by a cooler provided above the loading/unloading portion in the vapor heating furnace; and
    causing a gas to go in and out between the vapor heating furnace and the heating furnace, making a pressure in the continuous furnace uniform, and heating the loaded object, by a connection portion that is provided above the cooler, allows the vapor heating furnace and the heating furnace to communicate with each other, and has a pressure loss smaller than a pressure loss of the loading/unloading portion.

2. The gas phase type heating method of claim 1,
wherein a tub that heats the heat transfer liquid and generates the vapor is disposed in a lower portion of the vapor heating furnace.

3. A gas phase type heating device comprising:
a continuous furnace, which heats an object, including:
- a vapor heating furnace heating the object by using latent heat of condensation of vapor of a heat transfer liquid; and
- a heating furnace communicating with the vapor heating furnace, and, wherein the vapor heating furnace includes
- a loading/unloading portion that communicates with the heating furnace,
- a cooler that is disposed above the loading/unloading portion and cools the vapor of the heat transfer liquid, and
- a connection portion that is disposed above the cooler, allows the vapor heating furnace and the heating furnace to communicate with each other, allows a gas to go in and out between the vapor heating furnace and the heating furnace, and has a pressure loss smaller than a pressure loss of the loading/unloading portion.

4. The gas phase type heating device of claim 3,
wherein a tub that heats the heat transfer liquid and generates the vapor is disposed in a lower portion of the vapor heating furnace.

5. The gas phase type heating device of claim 3,
wherein an opening area of a longitudinal section of the connection portion is larger than an opening area of a longitudinal section of the loading/unloading portion.

6. The gas phase type heating device of claim 3,
wherein when a side close to an inlet through which the object is loaded is defined as an upstream side, and a side close to an outlet through which the object is unloaded is defined as a downstream side, an inlet loss on the upstream side of the connection portion and an inlet loss on the downstream side of the connection portion are the same.

7. The gas phase type heating device of claim 3,
wherein the connection portion has an opening surrounded by an inclined or curved surface with respect to a long-axis direction of the connection portion, and
by the loading/unloading portion having an opening surrounded by a surface orthogonal to a long-axis direction of the loading/unloading portion, the connection portion is configured to have a pressure loss smaller than a pressure loss of the loading/unloading portion.

* * * * *